United States Patent [19]

Fumia, Jr. et al.

[11] 3,880,843

[45] Apr. 29, 1975

[54] MEROCYANINE DYES

[75] Inventors: Arthur Fumia, Jr., Hilton; Donald W. Heseltine, Rochester, both of N.Y.

[73] Assignee: Eastman Kodak Company, Rochester, N.Y.

[22] Filed: Nov. 13, 1972

[21] Appl. No.: 305,767

Related U.S. Application Data

[62] Division of Ser. No. 83,621, Oct. 23, 1970, Pat. No. 3,718,476.

[52] U.S. Cl.... 260/240.1; 260/256.4 C; 260/287 R; 260/294.8 D; 260/294.8 E; 260/298; 260/304; 250/306.7; 260/306.8 R; 260/307 R; 250/307 D; 260/307 C; 260/309; 260/309.5; 260/309.2; 260/313.1; 260/326.11; 260/326.62
[51] Int. Cl............................................ C07d 91/44
[58] Field of Search.......... 260/240.1, 306.7, 307 B, 260/298, 309.7, 302 H, 304, 307 R, 307 D, 309 R, 309.2, 306.8 R, 307 C, 298, 294.8 D, 294.8 E, 287 R, 326.11, 309; 96/127, 139, 140

[56] References Cited
UNITED STATES PATENTS

| | | | |
|---|---|---|---|
| 3,334,105 | 8/1967 | Szaruasi | 260/294 |
| 3,384,486 | 5/1968 | Taber | 96/74 |
| 3,557,101 | 1/1971 | Taber | 260/240.1 |
| 3,732,247 | 5/1973 | Helsley | 260/326.8 |

*Primary Examiner*—Henry R. Jiles
*Assistant Examiner*—C. M. S. Jaisle
*Attorney, Agent, or Firm*—G. E. Battist

[57] ABSTRACT

Novel merocyanine dyes of which the acid nucleus, such as a rhodanine nucleus, has a 3-pyrrolinylalkyl group attached thereto. The dyes are spectral sensitizers for silver halide photographic emulsions and also increase the blue sensitivity of the silver halide. Intermediates for these dyes are novel cyanoalkyl-3-pyrrolines and aminoalkyl-3-pyrrolines.

7 Claims, No Drawings

MEROCYANINE DYES

This application is a division of application U.S. Ser. No. 83,621 filed Oct. 23, 1970, now U.S. Pat. No. 3,718,476, Patented Feb. 27, 1973.

This invention relates to photographic sensitizing dyes and to intermediates for such dyes and more particularly to merocyanine dyes having an acid nucleus with a 3-pyrrolinylalkyl group attached thereto and to photographic silver halide elements containing such dyes.

Many merocyanine dyes are excellent spectral sensitizers for negative silver halide emulsions. A problem with the merocyanines, however, has been their insolubility. This inherent insolubility of merocyanines has been improved by the introduction of dialkylaminoalkyl substituents, as in the following compound:

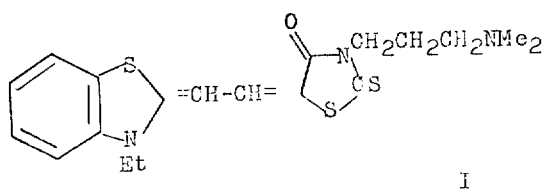

I

Dye I, which is disclosed in Taber et al U.S. Patent 3,384,486, is soluble in hydroxylic solvents as a hydro salt while its N-ethyl analog is extremely insoluble.

Merocyanine dyes such as Dye I, although excellent spectral sensitizers, do not chemically sensitize silver halide emulsions. The present invention is based on our discovery of a novel class of dyes which, like Dye I, are water soluble but which are not only efficient spectral sensitizers but also increase the inherent sensitivity of the emulsion, i.e., the blue sensitivity.

The novel dyes of our invention in general comprise merocyanine dyes of which the acidic nucleus is a rhodanine or analogous group and has as a nitrogen substituent a 3-pyrrolinyl-alkyl group. The novel dyes of the invention can be represented as follows:

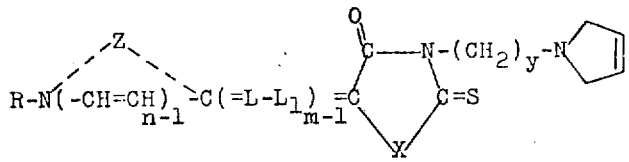

In the formula:

R represents an alkyl group having from 1 to 18 carbon atoms (e.g., methyl, sulfoethyl, hydroxyethyl, hydroxypropyl, sulfobutyl, carboxybutyl, hexyl, octyl, dodecyl, etc.) or an aryl group of 6 to 12 carbon atoms (e.g., phenyl, sulfophenyl, carboxyphenyl, tolyl, etc.).

Z represents the nonmetallic atoms required to complete a heterocyclic nucleus having from 5- to 6-atoms in the heterocyclic ring (which can contain a second hetero atom, e.g., a hetero oxygen, sulfur or selenium atom, or a second nitrogen atom) such as: a thiazole nucleus (e.g., thiazole, 4-methylthiazole, 4-phenylthiazole, 5-methylthiazole, 4,5-dimethylthiazole, 4,5-diphenylthiazole, etc.); a benzothiazole nucleus (e.g., benzothiazole, 4-chlorobenzothiazole, 5-chlorobenzothiazole, 4-methylbenzothiazole, 6-methylbenzothiazole, 5-bromobenzothiazole, 5-methoxybenzothiazole, 6-iodobenzothiazole, 5,6-dimethoxybenzothiazole, etc.); a naphthothiazole nucleus (e.g., α-naphthothiazole, α-naphthothiazole, 5-methoxy-β-naphthothiazole, 8-ethoxy-a-naphthothiazole, ββ-naphthothiazole, etc.); a thianaphtheno-7', 6', 4,5-thiazole nucleus (e.g., 4'-methoxy-thianaphtheno-7', 6',4,5-thiazole, etc.); an oxazole nucleus (e.g., 4-methyloxazole, 5-methyloxazole, 4-phenyloxazole, 4,5-diphenyloxazole, 4-ethyloxazole, 4,5-diethyloxazole, etc.); a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-ethoxybenzoxazole, 5,6-dichlorobenzoxazole, 5-hydroxybenzoxazole, etc.); a naphthoxazole nucleus (e.g., α-naphthoxazole, β-naphthoxazole, β, β-naphthoxazole, etc.); a selenazole nucleus (e.g., 4-methylselenazole, 4-phenylselenazole, etc.); a benzoselenazole nucleus (e.g., benzoselenazole, 5-chlorobenzoselenazole, 6-methoxybenzoselenazole, 5-hydroxybenzoselenazole, a tetrahydrobenzoselenazole, etc.); a naphthoselenazole nucleus (e.g., α-naphthoselenazole, β-naphthoselenazole, β, β-naphthoselenazole, etc.); a thiazoline nucleus (e.g., thiazoline, 4-methylthiazoline, etc.); a 2-pyridine nucleus (e.g., 2-pyridine, 5-methyl-2-pyridine, etc.); a 4-pyridine nucleus (e.g., 4-pyridine, 3-methyl-4-pyridine, etc.); a 2-quinoline nucleus (e.g., 2-quinoline, 3-methyl-2-quinoline, 5-ethyl-2-quinoline, 6-chloro-2-quinoline, 8-chloro-2-quinoline, 4-methoxy-2-quinoline, 8-hydroxy-2-quinoline, etc.); a 4-quinoline nucleus (e.g., 4-quinoline, 5-methyl-4-quinoline, 7-methyl-4-quinoline, 8-chloro-4-quinoline, etc.); a 1-isoquinoline nucleus (e.g., 1-isoquinoline,3,4-dihydro-1-isoquinoline, etc.); a 3-isoquinoline nucleus (e.g., 3-isoquinoline, etc.); a 3,3-dialkylindolenine nucleus (e.g., 3,3-dimethylindolenine, 3,3,5-trimethylindolenine, 3,3,7-trimethylindolenine, etc.); an imidazole nucleus (e.g., imidazole, 1-alkylimidazole, 1-alkyl-4-phenylimidazole, 1-alkyl-4,5-dimethylimidazole, etc.); a benzimidazole nucleus (e.g., benzimidazole, 1-alkylbenzimidazole, 1-arylbenzimidazole, 5,6-dichlorobenzimidazole, etc.); or a naphthimidazole nucleus (e.g., 1-alkyl-α-naphthimidazole, 1-aryl -β-naphthimidazole, 1-alkyl-5-methoxy-β-naphthimidazole, etc.).

L and L₁, which can be the same or different, represent methine groups such as -CE=, where E represents hydrogen; a lower alkyl such as methyl, butyl, etc.; an aryl group such as tolyl, napthyl, etc.; or a heterocyclic group such as 2-thienyl, 2-pyrryl, 3-pyrryl, 2-indolyl, 3-indolyl, 3-pyridyl,4-pyridyl or

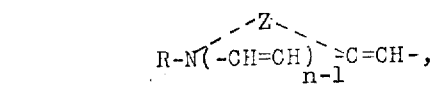

etc.; such that not more than one of L and L₁ contains an E group that is other than hydrogen.

n and m, which can be the same or different, each represents an integer from 1 to 3; y is an integer from 2 to 5; and X represents —S—, —O—, —Se—, or —NR$_1$—, where R$_1$ is hydrogen or an alkyl or aryl group as defined above for R.

The novel cyanoalkyl-3-pyrroline and aminoalkyl-3-pyrroline intermediate compounds of the invention can be represented as follows:

II 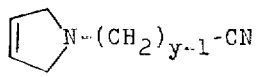

and

III 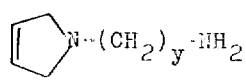

where y is an integer from 2 to 5.

These compounds can be prepared by reaction of 3-pyrroline with a halogen-substituted nitrile of the formula X—(CH$_2$)$_{y-1}$—CN, where X is chlorine, iodine or bromine, such as chloracetonitrile, 3-iodopropionitrile, 4-bromobutyronitrile, or 5-iodopentanonitrile. For this reaction, the halonitrile is added with stirring and, if desired, with heating, to an equimolar amount of 3-pyrroline in a hydrocarbon solvent such as benzene to form the acid salt of the desired cyanoalkyl-3-pyrroline compound. The precipitated acid salt is then dissolved in water and treated with a base stronger than pyrroline, for example, a tertiary amine such as triethylamine, to obtain the desired cyanoalkyl-3-pyrroline compound II. The latter is then chemically reduced, e.g., by reaction with lithium aluminum hydride in an ether solvent, to the corresponding primary amine. The amine is reacted in an alkaline solution with bis(carboxymethyl) trithiocarbonate to obtain an N-substituted rhodanine compound, which is subsequently condensed with a basic nucleus-supplying compound to form the desired merocyanine dye.

The series of reactions for preparing the intermediate compounds can be illustrated as follows:

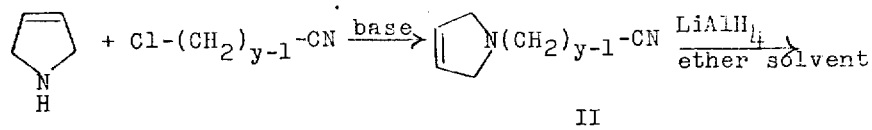

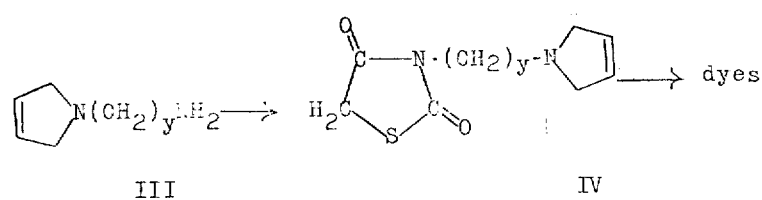

As an alternative for the preparation of such compounds in which y=3, the intermediate cyanoalkyl-3-pyrroline compound II can be obtained by the reaction of 3-pyrroline with acrylonitrile, the reaction being represented as follows:

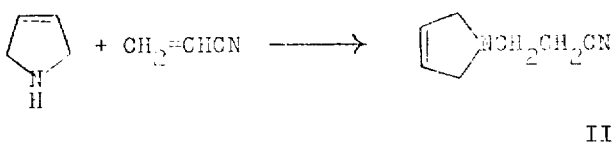

By methods well-known in the art, the novel intermediate aminoalkyl-3-pyrroline compounds III can be used to prepare other novel solubilized ketomethylene compounds, which like the novel compound IV, are useful as methine dye intermediates by reactions such as disclosed hereinafter; such other ketomethylene compounds including:

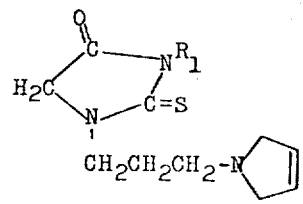

VI

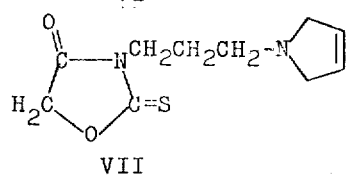

VII

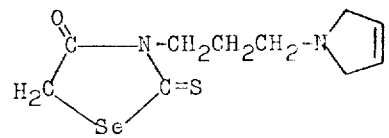

VIII and

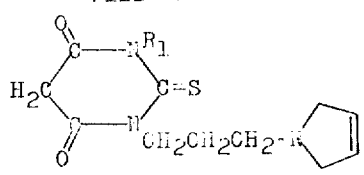

IX

Merocyanine dyes of the invention in which n is 1 can be obtained by reacting the N-substituted rhodanine compound with a cyclammonium salt of the formula

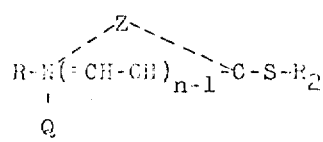

where R, Z and n have the meanings previously given, Q is an anion such as chloride, bromide, iodide, perchlorate or the like and R$_2$ is an alkyl group, e.g., methyl, ethyl, benzyl, etc. or an aryl group, e.g., phenyl, p-chlorophenyl, tolyl, etc. This condensation reaction is advantageously carried out by heating the reactants under reflux in an inert diluent such as methanol, ethanol, butanol, dimethylformamide, acetone, 1,4-dioxane or the like with a basic condensing agent, e.g., a trialkylamine such as triethylamine, a dialkylaniline such as N,N-dimethylaniline, or a heterocyclic tertiary amine, such as pyridine, quinoline, etc.

The dyes of the invention in which n is 2 to 3 can be prepared by condensing with the N-substituted rhodanine compound IV or its S, O, Se or $NR_1$ analogs, a cyclammonium salt of the formula

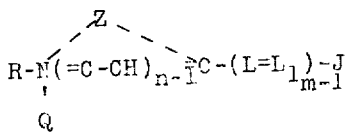

where R, Z, Q, n, L and $L_1$ and m have the meanings previously given and J represents a

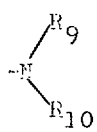

group, a—$SR_{11}$ group or a halogen atom )e.g., chlorine, bromine, etc.), $R_9$ represents the hydrogen atom, an alkyl group (e.g., methyl, ethyl, etc.), or the acyl group of a carboxylic acid (e.g., acetyl, propionyl, etc.), $R_{10}$ represents an aryl group (e.g., phenyl, tolyl, etc.), or $R_9$ and $R_{10}$ together represent the nonmetallic atoms necessary to complete a heterocyclic nucleus (e.g., a piperidine, merpholine, etc. nucleus), and $R_{11}$ represents a lower alkyl group. The condensation is advantageously carried out in the presence of a basic condensing agent, in an inert solvent and at an elevated temperature as described previously.

Our optical sensitizing dyes are used to advantage to sensitize silver halides, e.g., silver chloride, silver bromide, silver iodide, silver chlorobromide, silver bromoiodide, silver chlorobromoiodide, etc., which have been dispersed in any hydrophilic colloid known to be satisfactory for making light-sensitive photographic emulsions. Useful hydrophilic colloids include natural materials, e.g., gelatin, albumin, agar-agar, gum arabic, alginic acid, etc., and synthetic materials, e.g., polyvinyl alcohol, polyvinyl pyrrolidone, cellulose ethers, partially hydrolyzed cellulose acetate, etc.

The concentrations of our dyes in the emulsions can vary widely, i.e., from about 5 to 100 mg. per liter of flowable emulsion. The specific concentration will depend upon the dye, the type of light-sensitive material in the emulsion and the particular effects desired. The most advantageous dye concentration for any given emulsion can be readily determined by making the concentration series and observations customarily used in the art of emulsion making.

Our dyes are readily soluble in water in the presence of one equivalent of acid. The hydrophilic colloid-silver halide emulsion is sensitized to advantage by adding the appropriate amount of dye in aqueous solution to the emulsion with intimate mixing to insure uniform distribution. Any of the other methods customarily used in the art can be used for incorporating our dyes. For example, the dyes can be incorporated by bathing a photographic element coated with the emulsion, in a solution of the dye.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.) various gold compounds (e.g., potassium chloraurate, auric trichloride, etc.) (see U.S. Pat. Nos. 2,540,085; 2,597,856 and 2,597,915), various palladium compounds such as palladium chloride (U.S. Pat. No. 2,540,086), potassium chloropalladate (U.S. Pat. No. 2,598,079) etc., or mixtures of such sensitizers; antifoggants such as ammonium chloroplatinate (U.S. Pat. No. 2,566,245), ammonium chloroplatinite (U.S. Pat. No. 2,566,263), benzotriazole, nitrobenzimidazole, 5-nitroindazole, benzidine, mercaptans, etc. (see Mees "The Theory of the Photographic Process," Macmillan pub., page 460), or mixtures thereof; hardeners, such as formaldehyde (U.S. Pat. No. 1,763,533), chrome alum (U.S. Pat. No. 1,763,533), glyoxal (U.S. Pat. No. 1,870,354), dibromacrolein (Br. 406,750), etc.; color couplers, such as those described in U.S. Pat. No. 2,423,730, Spence and Carroll U.S. application 771,380 filed Aug. 29, 1947 (now U.S. Pat. No. 2,640,776), etc.; or mixtures of such addenda. Dispersing agents for color couplers, such as those set forth in U.S. Pat. Nos. 2,322,027 and 2,304,940 can also be employed in the above-described emulsions.

Our emulsions are coated to advantage on any of the materials used for photographic elements including, for example, paper, glass, cellulose acetate, cellulose nitrate, synthetic film-forming resins, e.g., the polyesters, the polyamides, polystyrenes, etc.

The following examples will serve further to illustrate our invention by showing the preparation of representative dyes and intermediates of the invention and the sensitizing effect of such dyes on silver halide emulsions. Examples 1 through 5 illustrate the preparation of novel merocyanine dyes.

EXAMPLE 1

5-(3-Ethyl-2-benzothiazolinylidene)-3-[3-3-pyrrolin-1-yl) propyl]rhodanine

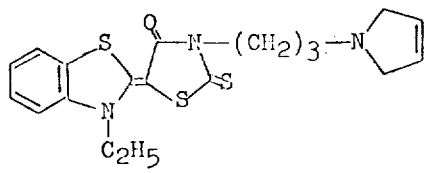

3-[3-(3-Pyrrolin-1-yl)propyl]rhodanine perchlorate (1.7 g.), 3-ethyl-2-phenylthiobenzothiazolium iodide (2.0 g.) and piperidine (1.5 ml.) are dissolved in ethanol (15 ml.) and heated at reflux for 5 minutes. After chilling, the crude dye is collected on a filter and then recrystallized from ethanol containing a small amount of piperidine. The yield of purified dye is 0.6 g. (30%), m.p. = 152°–153°C.

EXAMPLE 2

5-[3-Ethyl-2-benzothiazolinylidene)ethylidene]-3-[3-(3-pyrrolin-1-yl)propyl]rhodanine

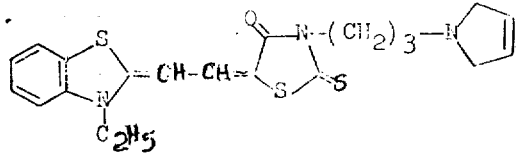

3-[3-(3-Pyrrolin-1-yl)propyl]rhodanine perchlorate (1.7 g.), 2-(2-acetanilidovinyl)-3-ethylbenzothiazolium iodide (2.3 g.), and piperidine (1.5 ml.) are dissolved in N,N-dimethyl-acetamide (10 ml.) and heated at a gentle reflux for 5 minutes. The hot reaction mixture is then diluted to approximately 250 ml. with boiling methanol. After standing at room temperature for 45 minutes, the dye is collected on a filter and dried. The yield is 1.3 g. (62 percent), m.p.=188°–189°C. dec.

EXAMPLE 3

5-[3-Ethyl-2-benzoxazolinylidene)ethylidene]-3-[3-(3-pyrrolin-1-yl)propyl]rhodanine

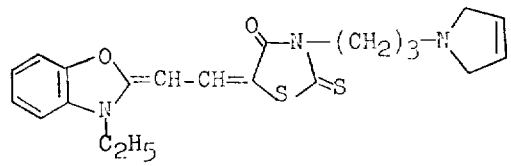

3-[3-(3-Pyrrolin-1-yl)propyl]rhodanine perchlorate (1.7 g.), 2-(2-acetanilidovinyl)-3-ethylbenzoxazolium iodide (2.2 g.), and triethylamine (2.1 ml.) are dissolved in ethanol (15 ml.) and heated at reflux for 5 minutes. Piperidine (1.0 ml.) is added and, after chilling, the crude dye is collected on a filter and dried. The crude yield is 1.7 g. (85 percent). After one recrystallization from ethanol, the yield of purified dye is 1.3 g. (65 percent), m.p.=201°–202°C. dec.

EXAMPLE 4

5-[3-Methyl-2-thiazolidinylidene)ethylidene]-3-[3-(3-pyrrolin-1-yl)propyl]rhodanine

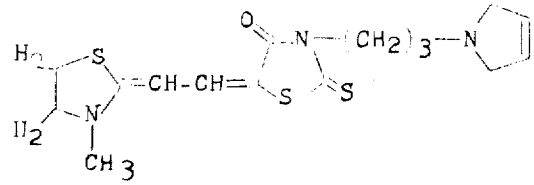

3-[3-(3-Pyrrolin-1-yl)propyl]rhodanine perchlorate (1.7 g.), 2-(2-anilinovinyl)-3-methyl-2-thiazolinium iodide (1.7 g.), acetic anhydride (1.0 ml.), and triethylamine (2.5 ml.) are dissolved in ethanol (15 ml.) and heated at reflux for 5 minutes. Piperidine (1.0 ml.) is added and, after chilling, the solid is collected on a filter and then recrystallized from methanol containing a small amount of piperidine. The yield of purified dye is 1.2 g. (67 percent), m.p. =133°–134°C. dec. >200°C.

EXAMPLE 5

5-[1-Methylnaphtho[1,2-d]thiazolin-2-ylidene)ethyl-idene]-3-[3-(3-pyrrolin-1-yl) propyl]-rhodanine

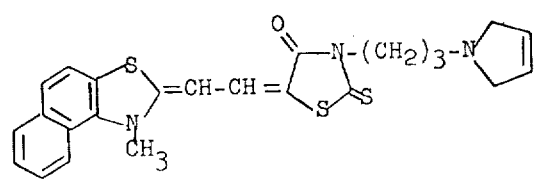

2-Formylmethylene-1-methylnaphtho[1,2-d]thiazoline (1.2 g.), 3-[3-(3-pyrrolin-1-yl)propyl]rhodanine perchlorate (1.7 g.), and piperidine (1.0 ml.) are dissolved in N,N-dimethylacetamide (10 ml.) and heated at a gentle reflux for 5 minutes. The hot reaction mixture is then diluted to approximately 250 ml. with boiling methanol. After standing at room temperature for 30 minutes, the dye is collected on a filter and dried. The yield is 0.8 g. (35 percent), m.p.=229°–230°C. dec.

Example 6 illustrates the preparation of a novel cyanoalkyl-3-pyrroline intermediate compound of the invention.

EXAMPLE 6

1-(2-Cyanoethyl)-3-pyrroline

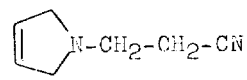

3-Pyrroline (69.1 g.) is added dropwise to acrylonitrile (80.0 g.) and the mixture allowed to stir at room temperature for 2-¾ hours. The mixture is then distilled in vacuo to yield 107.7 g. (88 percent) of product, b.p.=86°–88°C/3.0 mm Hg.

Example 7 illustrates the preparation of a novel aminoalkyl-3-pyrroline intermediate compound of the invention.

EXAMPLE 7

1-(3-Aminopropyl)-3-pyrroline

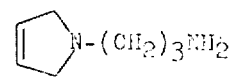

This compound is obtained by a lithium aluminum hydride reduction of the compound described in Example 6, 24.4 g. of the compound being added to 11.4 g. of lithium aluminum hydride in 450 ml. of ether at 25°C., with stirring for 20 hours. The yield is 65 –70 percent, b.p.=64 C/3.0 mm Hg.

Example 8 illustrates the preparation of a novel N-substituted rhodanine compound of the invention.

EXAMPLE 8

3-[3-(3-Pyrrolin-1 -yl)propyl]rhodanine perchlorate

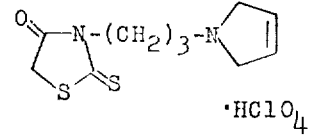

To a solution of sodium carbonate (11.1 g.) in water (250 ml.) is added bis (carboxymethyl) trithiocarbonate (22.6 g.) in small portions. 1-(3-Aminopropyl)-3-pyrroline (14.0 g.) is then added and the mixture heated on a steam bath for 2 hours with stirring. The mixture is then made strongly acidic with concentrated hydrochloric acid. After heating on a steam bath for an additional ½ hour, an aqueous solution of sodium perchlorate (18.0 g.) is added. After cooling, the mixture is found to be neutral and more concentrated hydrochloric acid is added to make the mixture strongly acidic. The stirred mixture is then heated on a steam bath for an additional 1- ½ hours and then chilled. The water is then decanted and the viscous residue stirred with other to form crystals. The solid is collected on a filter and dried. The yield is 14.3 g.(42 percent), m.p.=120°-121°C.

Example 9 illustrates the preparation and testing of novel photographic emulsions and elements of the invention and provides a comparison of the photographic properties of the dyes of Examples 1-5 with another merocyanine dye, referred to hereinafter as Dye A.

EXAMPLE 9

Photographic Utility

The dyes of Examples 1-5, dissolved in suitable solvents, are added to separate portions of a monodispersed sulfur and gold sensitized, 0.2 μ. silver bromoiodide gelatine emulsion containing 2.5 mole percent iodide at the concentrations indicated below. After digestion at 40°C. for 10 minutes, the emulsions are coated at a coverage of 100 mg. of Ag/ft$^2$ on a cellulose acetate film support. A sample of each coating is exposed on an Eastman IB sensitometer and to a wedge spectrograph, processed for 6 minutes at 20°C. in a developer similar to Kodak D-19 developer, fixed, washed and dried. Also tested under the same conditions is Dye A, of the following structure, which is like the novel dye of Example 2, except that it has an ethyl group instead of 3-pyrrolinyl attached to the nitrogen of the rhodanine nucleus.

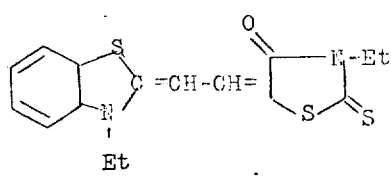

3-Ethyl-2-[3-ethyl-2-benzothiazolinylidene)ethylidene]rhodanine

The following table lists the results of the photographic tests of the dyes of Examples 1-5 and Dye A.

| Spectral Sensitization | | | |
|---|---|---|---|
| Example Number | Conc. g/m.BrI | λmax(nm.) | Range(nm.) | *Relative Speed |
| 1 | .20 | 470 | to 515 | 234 |
| 2 | .20 | 590 | to 640 | 158 |
| Dye A | .20 | 590 | to 625 | 93 |
| 3 | .20 | 550 | to 600 | 224 |
| 4 | .30 | 535 | tp 570 | 240 |
| 5 | .10 | 600 | to 660 | 200 |

* The 365 line exposure of unsensitized control=100

The spectral sensitization data of the above table (maximum wavelength sensitization and range) demonstrate that the dyes of the present invention spectrally sensitize silver halide emulsions to light of longer wavelength than the intrinsic blue sensitivity of the emulsion. The Relative Speed column of the table also shows the unexpected increase in blue sensitivity for Dyes 1-5 as compared with the unsensitized control and Dye A.

We do not wish to be bound by theoretical explanations of these valuable results. A possible explanation, however, is that the introduction into a ketomethylene nucleus, such as a rhodanine nucleus, of a 3-pyrrolinylalkyl substituent and the position of the double bond in the heterocyclic ring of this substituent not only provides solubility in hydrophilic solvents but also unexpectedly improves the positive hole-trapping ability of the resulting merocyanine dyes.

Certain of the novel compounds of the invention, such as the substituted rhodanine compound of Example 8 are conveniently prepared and used as a salt, so when referred to in the claims, the salts of such compounds are also meant to be included.

The invention has been described in detail with particular reference to preferred embodiments thereof, but it will be understood that variations and modifications can be effected within the spirit and scope of the invention.

We claim:

1. A merocarbocyanine dye of the formula

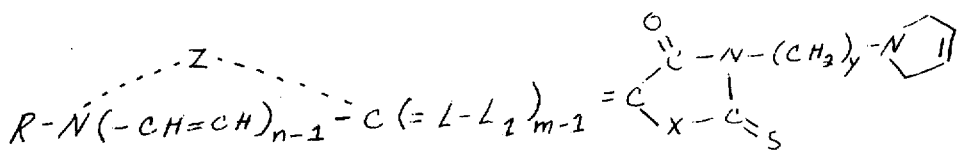

wherein R represents an alkyl sulfoalkyl, hydroxyalkyl, or carboxyalkyl of 1 to 18 carbon atoms or a phenyl, sulfophenyl, carboxyphenyl, or tolyl group;

Z represents the nonmetallic atoms required to complete a heterocyclic nucleus selected from the group consisting of a thiazole nucleus, a benzothiazole nucleus, a naphthothiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-pyridine nucleus, a 4-pyridine nucleus, a 2-quinoline nucleus, a 4-quinoline nucleus, a 1-isoquinoline nucleus, a 3,3-dialkylindolenine nucleus, an imidazole nucleus, a benzimidazole nucleus, and a naphthimidazole nucleus;

L and L$_1$ represent methine groups;

n and m represent integers from 1 to 3;

X represents sulfur, oxygen, selenium or NR$_1$, where R$_1$ is hydrogen or a group as defined for R; and y is an integer from 2 to 5.

2. A merocyanine dye according to claim 1 wherein X is sulfur and y is 3.

3. A merocyanine dye according to claim 1 of the formula

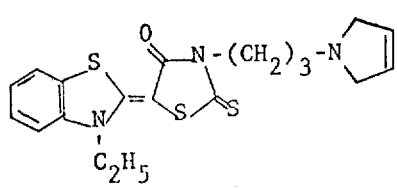

4. A merocyanine dye according to claim 1 of the formula
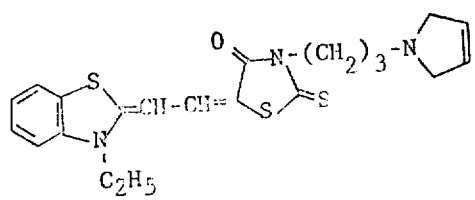
5. A merocyanine dye according to claim 1 of the formula
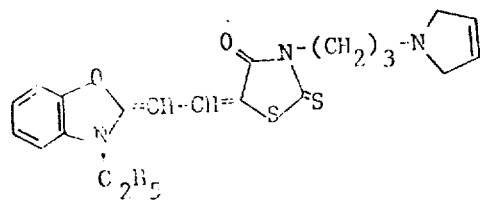
6. A merocyanine dye according to claim 1 of the formula
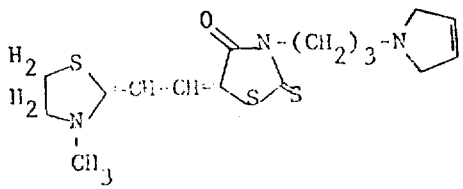
7. A merocyanine dye according to claim 1 of the formula
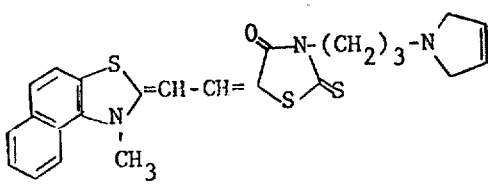
* * * * *